(12) United States Patent
Jung et al.

(10) Patent No.: US 12,372,469 B2
(45) Date of Patent: Jul. 29, 2025

(54) DEFECT CLASSIFICATION EQUIPMENT FOR SILICON CARBIDE SUBSTRATE USING SINGLE INCIDENT LIGHT-BASED PHOTOLUMINESCENCE AND DEFECT CLASSIFICATION METHOD USING THE SAME

(71) Applicant: ETAMAX CO., LTD, Suwon-si (KR)

(72) Inventors: Huyndon Jung, Yeongju-si (KR); Min-jung Lee, Gunpo-si (KR)

(73) Assignee: ETAMAX CO., LTD, Suwon-si (KR)

( * ) Notice: Subject to any disclaimer, the term of this patent is extended or adjusted under 35 U.S.C. 154(b) by 361 days.

(21) Appl. No.: 17/660,770

(22) Filed: Apr. 26, 2022

(65) Prior Publication Data
US 2023/0113093 A1    Apr. 13, 2023

(30) Foreign Application Priority Data
Oct. 8, 2021 (KR) .................. 10-2021-0133957

(51) Int. Cl.
*G01N 21/64* (2006.01)
*G01N 21/88* (2006.01)
(Continued)

(52) U.S. Cl.
CPC ..... *G01N 21/6489* (2013.01); *G01N 21/8851* (2013.01); *G01N 21/9501* (2013.01);
(Continued)

(58) Field of Classification Search
CPC .......... G01N 21/6489; G01N 21/9501; G01N 21/8851; G01N 2021/8874; G06T 2207/30148
See application file for complete search history.

(56) References Cited

U.S. PATENT DOCUMENTS

2016/0327485 A1* 11/2016 Kiss .................. G01N 21/9505
2023/0059737 A1*  2/2023 Itoh ......................... C30B 29/36

FOREIGN PATENT DOCUMENTS

JP       6758197 B2    9/2020
KR   10-2016-0024968 A    3/2016

OTHER PUBLICATIONS

Iwata, H. P., et al. "Effective masses of two-dimensional electron gases around cubic inclusions in hexagonal silicon carbide." Physical Review B 68.24 (2003): 245309.
(Continued)

*Primary Examiner* — Carolyn Fin
(74) *Attorney, Agent, or Firm* — Knobbe, Martens, Olson, & Bear, LLP

(57) ABSTRACT

Stack fault inspection apparatus and method are disclosed. The apparatus includes a sample stage fixing the silicon carbide substrate and allow the incident light to scan the substrate surface; an incident light source configured to irradiate a vertical illumination light of a wavelength corresponding to an energy greater than a band gap energy of the substrate to at least a portion of a surface of the substrate in a direction substantially perpendicular to the surface of the substrate; a photomultiplier tube (PMT) configured to obtain a photoluminescence mapping image having a wavelength corresponding to the band gap energy of the substrate from the surface of the substrate; and a controller configured to process the mapping image and identify stacking faults.

9 Claims, 8 Drawing Sheets

(51) Int. Cl.
*G01N 21/95* (2006.01)
*G06T 7/00* (2017.01)

(52) U.S. Cl.
CPC ...... *G06T 7/001* (2013.01); *G01N 2021/8874* (2013.01); *G01N 2201/021* (2013.01); *G06F 2218/14* (2023.01); *G06T 2207/30148* (2013.01)

(56) References Cited

OTHER PUBLICATIONS

Sun, J. W., et al. "Shockley-Frank stacking faults in 6H-SiC." Journal of Applied Physics 111.11 (2012): 113527.

\* cited by examiner

Fig. 4

|     | X index | Y index | PW       | SFs     |
|-----|---------|---------|----------|---------|
| P1  | 4449    | -3541   | 541.0772 | 3C type |
| P2  | 4537    | -3221   | 483.9628 | 3SSF    |
| P3  | 4805    | -3329   | 483.9628 | 3SSF    |
| P4  | 4709    | -2465   | 539.5392 | 3C type |
| P5  | 4206    | -2455   | 483.1881 | 3SSF    |
| P6  | 4074    | -2503   | 463.0186 | unknown |
| P7  | 3834    | -3023   | 483.9628 | 3SSF    |
| P8  | 3734    | -3139   | 456.8022 | 4SSF    |
| P9  | 2838    | -2799   | 539.5392 | 3C type |
| P10 | 2650    | -3411   | 542.6149 | 3C type |
| P11 | 3606    | -2287   | 456.8022 | 4SSF    |

DEFECT CLASSIFICATION EQUIPMENT FOR SILICON CARBIDE SUBSTRATE USING SINGLE INCIDENT LIGHT-BASED PHOTOLUMINESCENCE AND DEFECT CLASSIFICATION METHOD USING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to devices and methods for classifying defects of SiC substrates using photoluminescence.

BACKGROUND

Photoluminescence is generated in the process of excitation of electrons from the valence band to the conduction band by irradiating the sample with light having energy greater than the band gap of the sample material, and return of the excited electrons to the valence band. Photoluminescence is a useful method for non-destructively analyzing the physical properties of semiconductors, as it does not require any special treatment and does not cause damage to the sample to be analyzed because it irradiates incident light.

Korean Patent Application Laid-Open No. 2016-0024968 and Japanese Patent Registration No. 6758197 disclose the related technology. The disclosure of this section is to provide background information relating to the present disclosure. Applicant does not admit that any information contained in this section constitutes prior art.

SUMMARY

In the surface photoluminescence mapping data of the SiC substrate, the characteristic photoluminescence appears overall on the surface, and photoluminescence of a wavelength different from the characteristic photoluminescence emitted by various defects including stacking faults is indicated. One aspect of the present disclosure is to recognize the position of the defects on the SiC substrate and to rapidly classify stacking faults from the defects for each position. To this end, after obtaining the location information of the defects by mapping the photoluminescence image with a single device equipped with a mapping function and a spectroscopic function, spectroscopic analysis is performed only at the location of the defects.

The present disclosure provides a method for classifying a stacking fault of a silicon carbide substrate using single incident light-based photoluminescence, the method comprising the steps of: irradiating a vertical illumination light of a wavelength corresponding to an energy greater than the band gap energy of the substrate to every portion of the surface of the substrate, in a direction substantially perpendicular to the surface of the substrate; obtaining a photoluminescence mapping image having a wavelength corresponding to the band gap energy of the substrate from the surface of the substrate using a photomultiplier tube (PMT); classifying identifiable defect images having different wavelengths from the mapping image having a wavelength corresponding to the band gap energy of the substrate obtained from the PMT into shapes and sizes and securing location data; classifying stacking faults from the classified defects and assigning coordinates to each central position of the selected stacking faults using the location data; sequentially irradiating the vertical illumination light for the stacking faults to which the coordinates are assigned; acquiring a photoluminescence spectrum emitted from each stacking fault to which the vertical illumination light is irradiated with a spectrometer; and classifying the characteristics of each stacking fault by comparing the peak wavelength in the region of 400 nm or more of the photoluminescence spectrum obtained from each stacking fault with the central wavelength in the stacking fault database.

In the foregoing method, the classifying stacking faults from the classified defects can be executed by a computer having a program of comparing the identifiable defects classified by shape and size with the stacking fault database comprising shapes and sizes of stacking faults of 1SSF, 2SSF, 3SSF, 4SSF and 3C.

In the foregoing method, the wavelength corresponding to the band gap energy of the substrate is 390 nm, and the wavelength of vertical illumination light having a wavelength corresponding to energy greater than the band gap energy of the substrate is 355 nm.

In the foregoing method, the center wavelengths of 1SSF, 2SSF, 3SSF, 4SSF and 3C of the stacking fault database are 420 nm, 500 nm, 480 nm, 455 nm and 540 nm respectively, and in the range of 400 nm or more of the photoluminescence spectrum, at the step of comparing the peak wavelength of the stacking fault to the center wavelength of the stacking fault database, the peak wavelengths within 5 nm above and below the center wavelength of each stacking fault database may be classified as corresponding stacking fault.

The present disclosure provides an apparatus for classifying a stacking fault of a silicon carbide substrate using single incident light-based photoluminescence, the apparatus comprising: a sample stage assembly capable of fixing the silicon carbide substrate and allowing the incident light to scan the substrate surface; an incident light source unit irradiating a vertical illumination light of a wavelength corresponding to an energy greater than the band gap energy of the substrate to every portion of the surface of the substrate in a direction substantially perpendicular to the surface of the substrate; a photomultiplier tube (PMT) obtaining a photoluminescence mapping image having a wavelength corresponding to the band gap energy of the substrate from the substrate surface; a control unit comprising a shape classification unit classifying the identifiable defects displayed on the photoluminescence mapping image of the substrate obtained from the PMT into shapes and sizes and secures position data, a coordinate assignment unit classifying stacking faults from the classified defects and assigning coordinates to the respective central positions of the selected stacking faults using position data, and an adjustment unit adjusting the stage assembly and the incident light source to sequentially irradiate the vertical illumination light to the coordinate assigned stacking faults; a spectrometer for obtaining a photoluminescence spectrum emitted from each stacking fault to which the vertical illumination light is irradiated; and a characteristic classification unit for classifying characteristics for each stacking fault by comparing a peak wavelength in a region of 400 nm or more of the photoluminescence spectrum obtained from each stacking fault with a central wavelength in the stacking fault database, each the control unit and the characteristic classification unit comprise a computer.

In the foregoing apparatus, the classifying stacking faults from the classified defects is performed by a computer having a program of comparing the identifiable defects classifying by shape and size with the stacking fault database comprising shapes and sizes of stacking faults of 1SSF, 2SSF, 3SSF, 4SSF and 3C.

In the foregoing apparatus, the wavelength corresponding to the band gap energy of the substrate is 390 nm, and the wavelength of vertical illumination light having a wavelength corresponding to energy greater than the band gap energy of the substrate is 355 nm.

In the foregoing apparatus, the center wavelengths of 1SSF, 2SSF, 3SSF, 4SSF and 3C of the stacking fault database are 420 nm, 500 nm, 480 nm, 455 nm and 540 nm respectively, and in the range of 400 nm or more of the photoluminescence spectrum, at the step of comparing the peak wavelength of the stacking fault to the center wavelength of the stacking fault database, the peak wavelengths within 5 nm above and below the center wavelength of each stacking fault database may be classified as corresponding stacking fault.

The apparatus and method for classifying a stacking fault of a silicon carbide substrate using single incident light-based photoluminescence according to aspects of the present disclosure maps a photoluminescence image with one device having a mapping function and a spectroscopic function to obtain the location information of the defects and then performs spectroscopic analysis only at the location of the stacking faults. It is possible to quickly and accurately classify defects on a SiC substrate compared to the method in which a plurality of bandpass filters are used to measure each photoluminescence wavelength.

DESCRIPTION OF THE DRAWINGS

FIG. 4 is a view showing the classification of stacking fault types based on the coordinates of each surface stacking flaw shown in the mapping image of FIG. 3 and the spectroscopically analyzed central wavelength, according to an embodiment of the present disclosure.

DETAILED DESCRIPTION OF EMBODIMENTS

Figure 1:
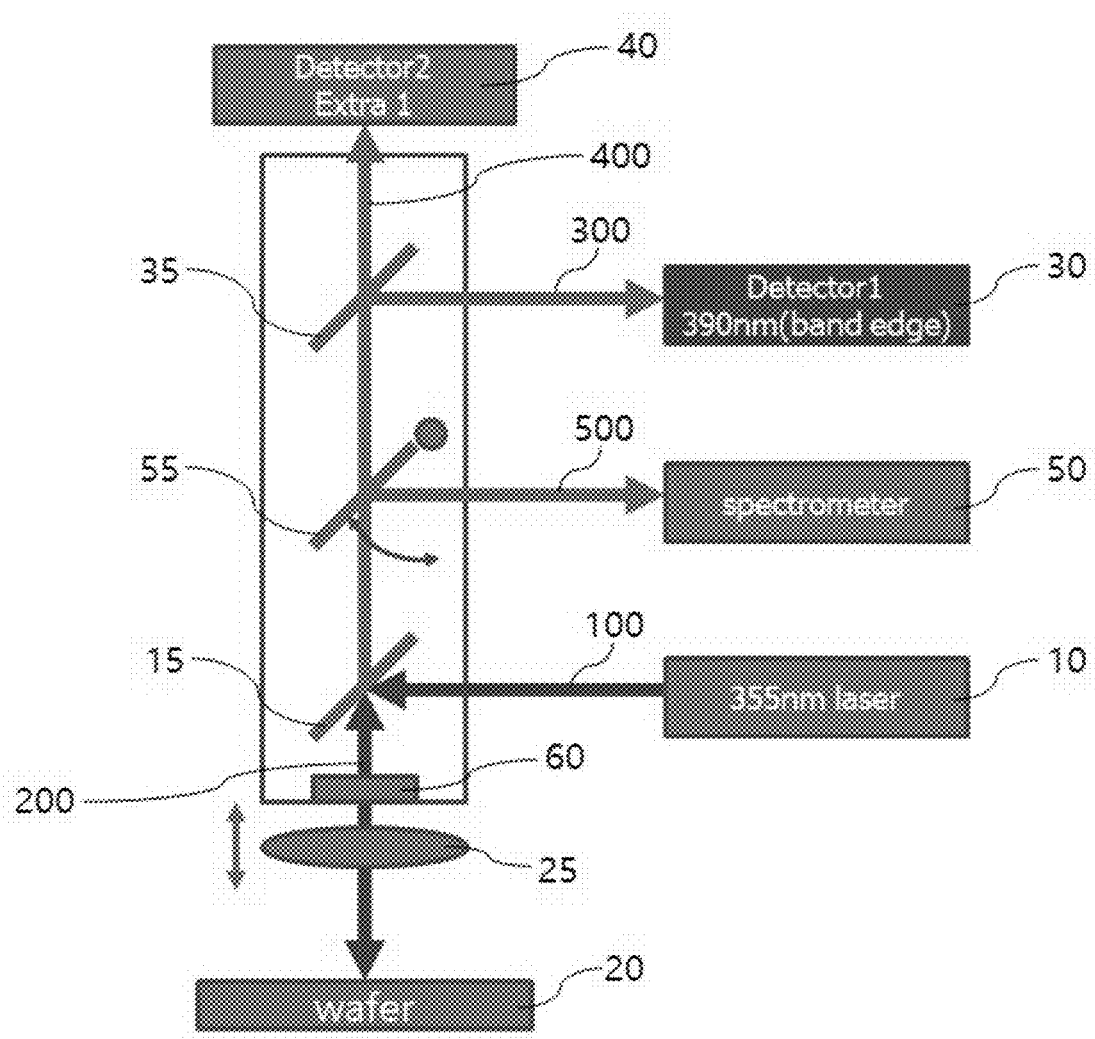
FIG. 1 is a conceptual diagram of a device for classifying stacking faults of a silicon carbide substrate using single incident light-based photoluminescence, according to an embodiment of the present disclosure.

Prior to the detailed description of the present disclosure, terms or words used in the present specification and claims described below should not be construed as being limited to ordinary or dictionary meaning. Therefore, embodiments described in the present specification and the configurations illustrated in the drawings are merely examples and are not intended to represent all of the technical spirit of the present disclosure, such that it should be understood that various equivalents and deformed examples capable of replacing these at the time of filing the present disclosure can be present.

When there is a defect in the sample material such as impurities, an energy level can be formed in the band gap. When an excited electron transition happens, it may come down to an energy level above the valence band created by the impurity. On the other hand, the energy level located below the conduction band formed by the impurity may come down to the energy level above the valence band formed by the impurity. Therefore, if photoluminescence analysis is performed, photoluminescence corresponding to energy corresponding to various electron transitions occurring between various energy levels formed by raw materials and impurities can be observed.

Stacking faults occurring on the substrate surface also generate photoluminescence having different wavelengths for each type. However, in a classification method using photoluminescence, a photomultiplier tube (PMT) is used to classify or inspect the stacking faults by installing a band pass filter for every wavelength at which the stacking faults appear. It is also possible to obtain a luminescence image with a time delay and integration (TDI) camera using a line beam, etc., pass it through a bandpass filter for each wavelength, and then separate the types of stacking faults. Alternatively, defects had to be identified by performing analysis using a spectrometer at all points on the front side of the substrate. However, in the classification of the bandpass filter by wavelength, accurate classification is difficult due to overlapping wavelengths of actual defects, and since simultaneous measurement of several pass paths (ports) may need to be performed for classification by wavelength, the data becomes too large. When spectroscopic analysis is performed at all points on the substrate surface, the minimum exposure time for signal classification of the spectrometer is several milliseconds (msec) or more for each point, so the measurement time is also excessively long.

When there is a defect in the sample material such as impurities, an energy level can be formed in the band gap. When an excited electron transition happens, it may come down to an energy level above the valence band created by the impurity. On the other hand, the energy level located below the conduction band formed by the impurity may come down to the energy level above the valence band formed by the impurity. Therefore, if photoluminescence analysis is performed, photoluminescence corresponding to energy corresponding to various electron transitions occurring between various energy levels formed by raw materials and impurities can be observed.

Stacking faults occurring on the substrate surface also generate photoluminescence having different wavelengths for each type. However, in the classification method using photoluminescence, a photomultiplier tube (PMT) is used to classify the stacking faults by installing a band pass filter for every wavelength at which the stacking faults appear. It is also possible to obtain a luminescence image with a time delay and integration (TDI) camera using a line beam, etc., pass it through a bandpass filter for each wavelength, and then separate the types of stacking faults. Alternatively, defects had to be identified by performing analysis using a spectrometer at all points on the front side of the substrate.

However, in the classification of the bandpass filter by wavelength, accurate classification is difficult due to overlapping wavelengths of actual defects, and since simultaneous measurement of several pass paths (ports) may need to be performed for classification by wavelength, the data becomes too large. When spectroscopic analysis is performed at all points on the substrate surface, the minimum exposure time for signal classification of the spectrometer is several milliseconds (msec) or more for each point, so the measurement time is also excessively long.

Hereinafter, embodiments of the present disclosure are further discussed will be described in detail below with reference to the accompanying drawings so that those skilled in the art to which the present disclosure pertains can easily practice them. FIG. 1 is a conceptual diagram of a device for classifying stacking faults of a silicon carbide substrate using single incident light-based photoluminescence, according to an embodiment of the present disclosure.

In an embodiment of the present disclosure, an apparatus for classifying or inspecting a stacking fault of a silicon carbide substrate using single incident light-based photoluminescence, the apparatus comprising: a sample stage assembly 20 capable of fixing the silicon carbide substrate and allowing the incident light to scan the substrate surface; an incident light source unit 10 irradiating a vertical illumination light of a wavelength corresponding to an energy greater than the band gap energy of the substrate to every portion of the surface of the substrate in a direction substantially perpendicular to the surface of the substrate; a photomultiplier tube (PMT) 30 obtaining a photoluminescence mapping image having a wavelength corresponding to the band gap energy of the substrate from the substrate surface; a control unit comprising a shape classification unit classifying or identifying the identifiable defects displayed on the photoluminescence mapping image of the substrate obtained from the PMT into shapes and sizes and secures position data, a coordinate assignment unit classifying stacking faults from the classified defects and assigning coordinates to the respective central positions of the selected stacking faults using position data, and an adjustment unit adjusting the stage assembly and the incident light source to sequentially irradiate the vertical illumination light to the coordinate assigned stacking faults; a spectrometer 50 for obtaining a photoluminescence spectrum emitted from each stacking fault to which the vertical illumination light is irradiated; and a characteristic classification unit for classifying characteristics for each stacking fault by comparing a peak wavelength in a region of 400 nm or more of the photoluminescence spectrum obtained from each stacking fault with a central wavelength in the stacking fault database. In an embodiment of the present disclosure, the stacking fault database includes various related information such as the size and shape of the stacking faults.

In an embodiment of the present disclosure, the control unit and the characteristic classification unit may include a computer represented by a central processing unit, an arithmetic unit, and the like. In an embodiment of the present disclosure, the condenser 25 may be positioned in the incident light incident path on the sample stage assembly and in the substrate surface emission photoluminescence passing path by the incident light. In an embodiment of the present disclosure, a total reflection or partial reflection mirror may be located on the path of the incident light 100 from the incident light source and the path of the photoluminescence 200 emitted from the substrate to the photoelectric amplifier tube and the spectrometer.

In an embodiment of the present disclosure, the incident light 100 is reflected by the mirror 15 toward the sample stage assembly 20, and the emitted photoluminescence 200 passes through the mirror 15. Then, it is reflected from the mirror 35 that reflects the photoluminescence 300 of the wavelength (390 nm) corresponding to the band gap energy and may be directed toward the photoelectric amplifier 30. In an embodiment of the present disclosure, the photoluminescence 200 emitted from the stacking defect may pass through the mirror 15 and then be reflected 500 from the mirror 55 to face the spectrometer 50. In an embodiment of the present disclosure, the classifying of the stacking fault can be executed by a computer having a program of comparing the identifiable defects classified by shape and size with the stacking fault database comprising shapes and sizes of stacking faults of 1SSF, 2SSF, 3SSF, 4SSF and 3C. In the present disclosure, SSF is an abbreviation of Shockley stacking fault as described in Sun et al., "Shockley-Frank stacking faults in 6H-SiC," J. Appl. Phys. 111, 113527 (2012), the disclosure of which is incorporated by reference herein. 3C stands for 3C-like faulted regions in the 4H-SiC matrix.

In addition, a wavelength corresponding to the band gap energy of the substrate may be 390 nm, and a wavelength of vertical illumination light having a wavelength corresponding to an energy greater than the band gap energy of the substrate may be selected as 355 nm. In one embodiment of the present disclosure, the equipment may further install an extra detector 40 for detecting the photoluminescence 400 passing through the mirror 35. In an embodiment of the present disclosure, any known method may be used for the machine learning.

Figure 2:
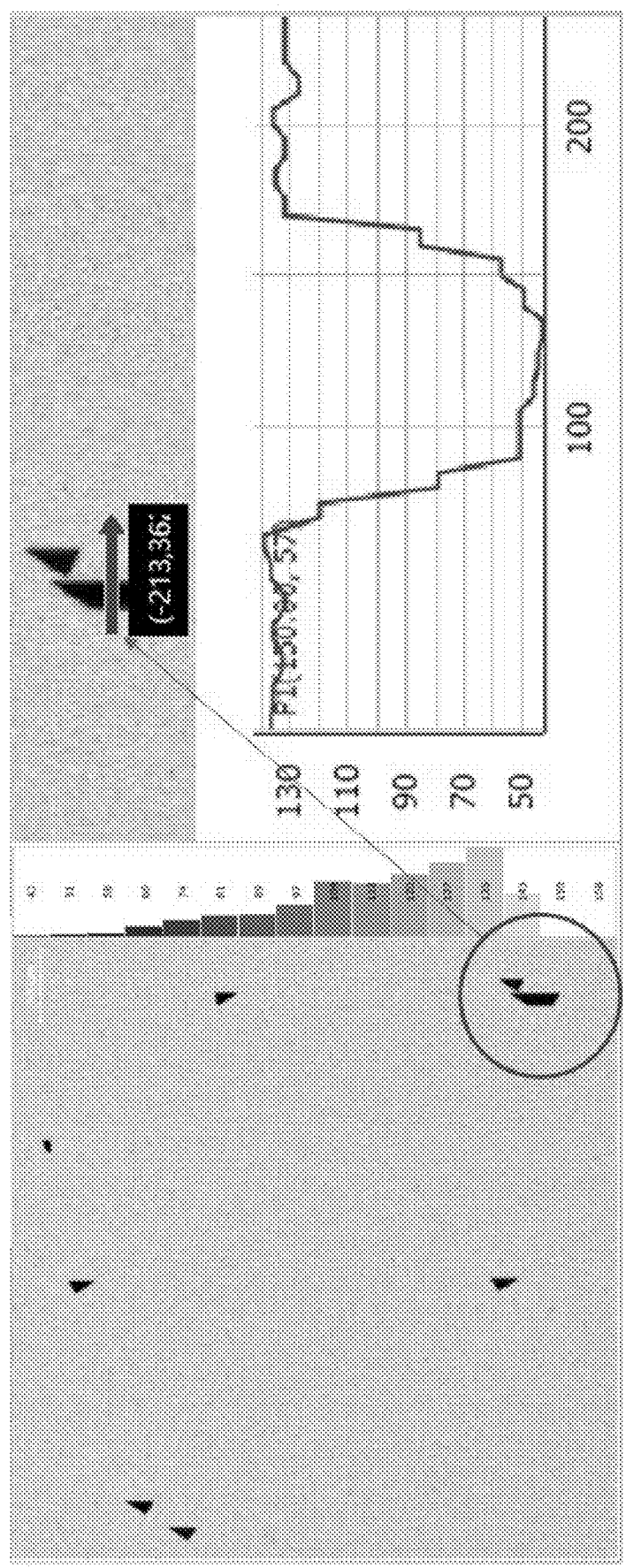
FIG. 2 is a line profile regarding the shape (left) and photoluminescence intensity at a specific location of stacked bonding through mapping by a photomultiplier tube (PMT) according to an embodiment of the present disclosure.

FIG. 2 is a line profile regarding the shape (left) and photoluminescence intensity at a specific location of stacked bonding through mapping by a photomultiplier tube (PMT) according to an embodiment of the present disclosure. Most of the Shockley type stacking faults in 4H-SiC have triangular or quadrangular plate-shaped defects, which are clearly observed in photoluminescence images with a wavelength (390 nm) corresponding to the energy band gap of the substrate. As can be seen in FIG. 2, it can be confirmed that the intensity of photoluminescence is lowered at the location of the surface lamination defect. Through this, it is possible to easily identify the location of the stacking defect through photoluminescence mapping.

Figure 3:
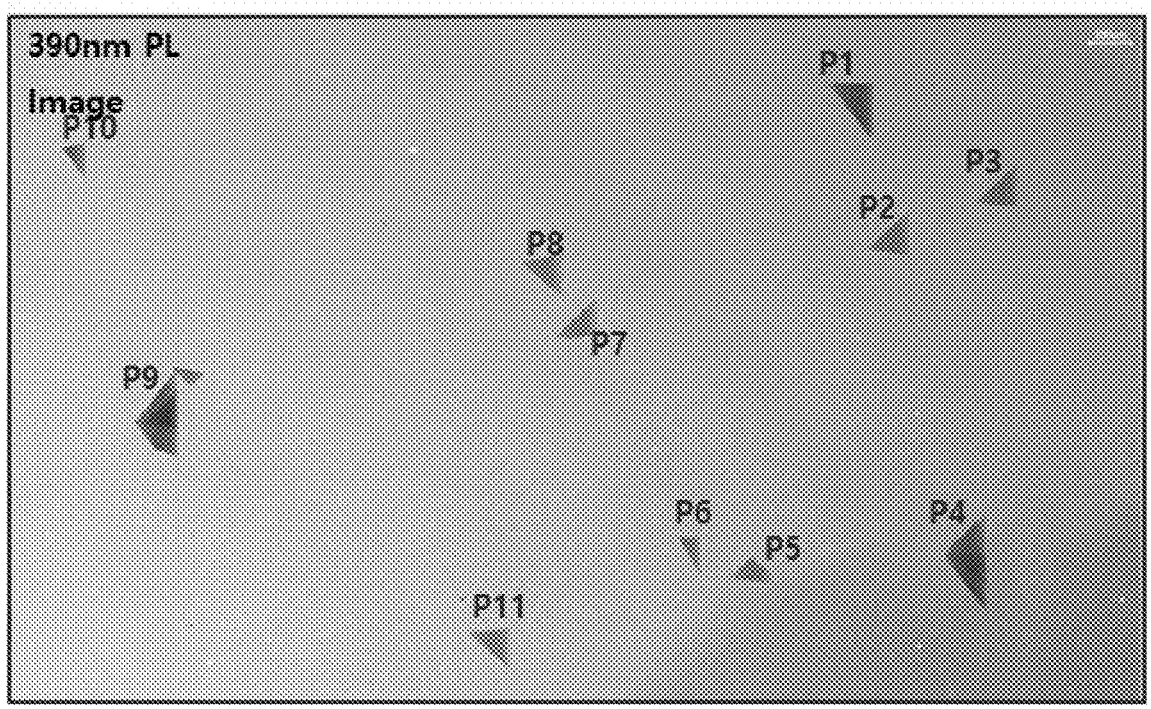
FIG. 3 shows a mapping image of a photoluminescence wavelength (390 nm) corresponding to the band gap energy of a SiC substrate and a median range of photoluminescence wavelengths for each surface stacking fault, according to an embodiment of the present disclosure.

FIG. 3 shows a mapping image of a photoluminescence wavelength (390 nm) corresponding to the band gap energy of a SiC substrate and a median range of photoluminescence wavelengths for each surface stacking fault, according to an embodiment of the present disclosure. FIG. 4 is a view showing the classification of stacking fault types based on the coordinates of each surface stacking flaw shown in the mapping image of FIG. 3 and the spectroscopically analyzed central wavelength, according to an embodiment of the present disclosure. The wavelength ranges of the stack faults, 1SSF, 2SSF, 3SSF, 4SSF and 3C are as follows:

1SSF: 420±5 nm,
2SSF: 500±5 nm,
3SSF: 480±5 nm,
4SSF: 455±5 nm, and
3C Type: 540±5 nm.

In an embodiment of the present disclosure, the center wavelengths of 1SSF, 2SSF, 3SSF, 4SSF and 3C of the stacking fault database are 420 nm, 500 nm, 480 nm, 455 nm and 540 nm respectively, and in the range of 400 nm or more of the photoluminescence spectrum, at the step of comparing the peak wavelength of the stacking fault to the center wavelength of the stacking fault database, the peak wavelengths within 5 nm above and below the center wavelength of each stacking fault database may be classified as corresponding stacking fault.

Figure 5A:
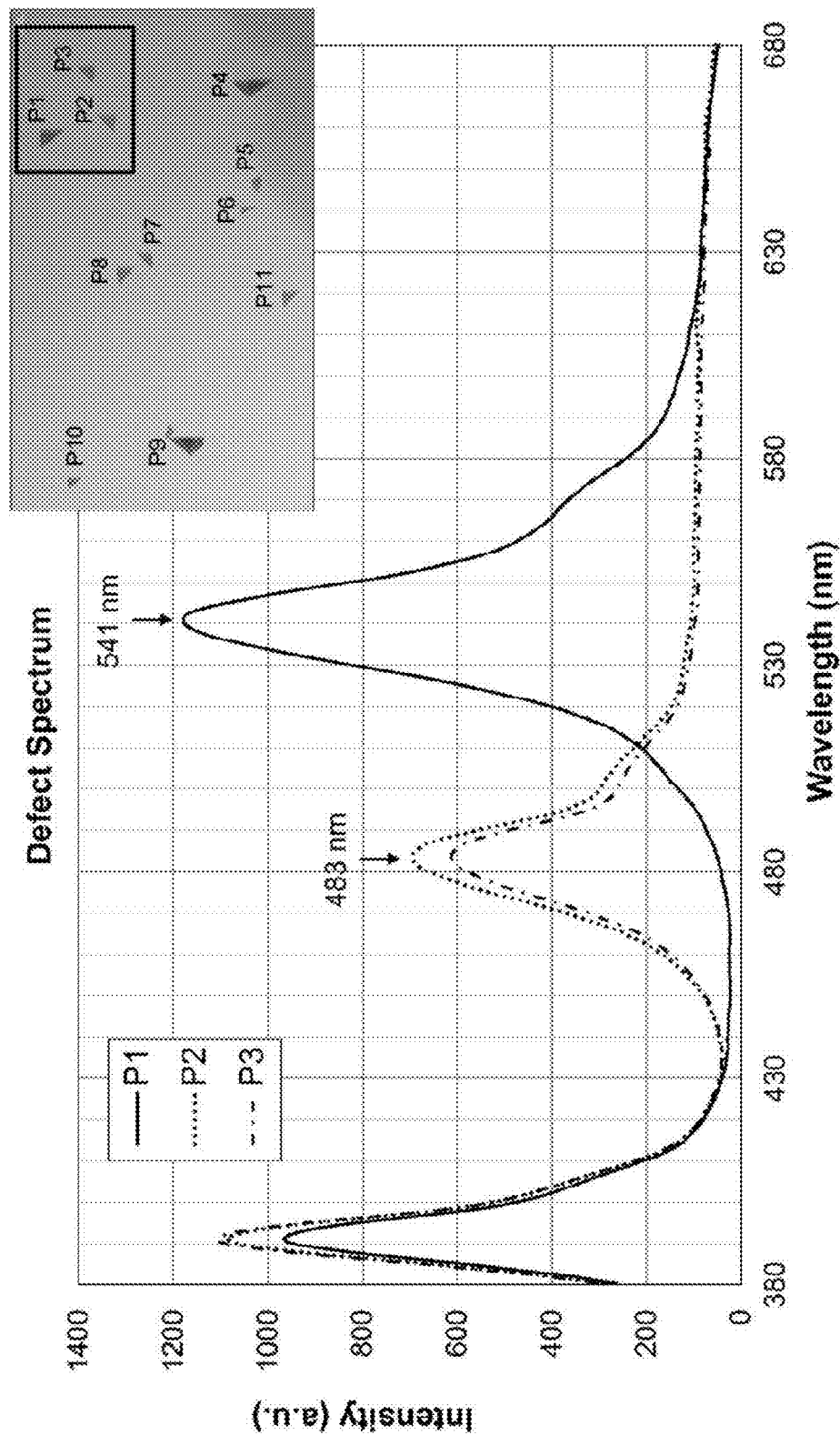
FIGS. 5A-5C are graphs showing the spectral data of the stacking fault of FIG. 4, according to an embodiment of the present disclosure.
Figure 5B:
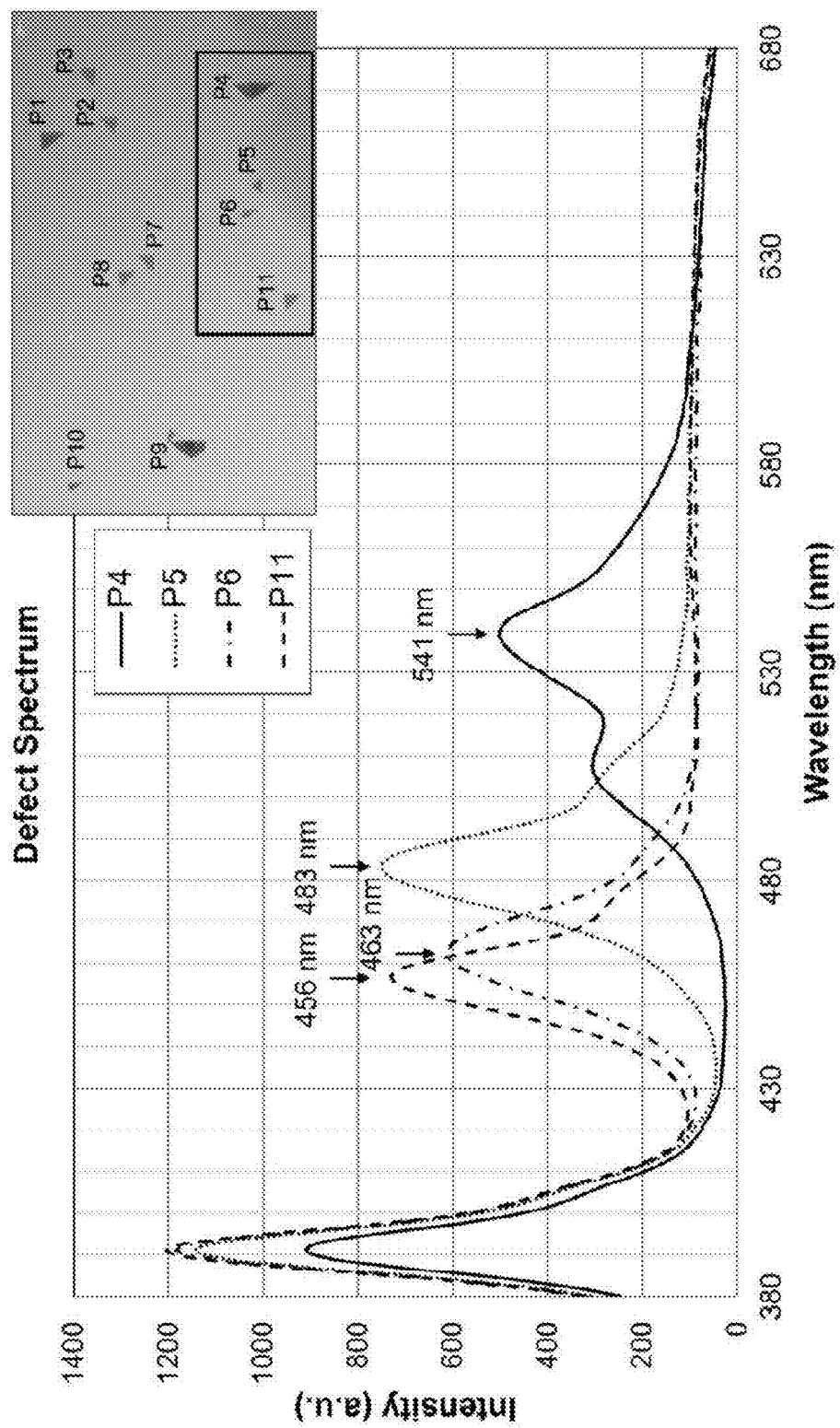
Figure 5C:
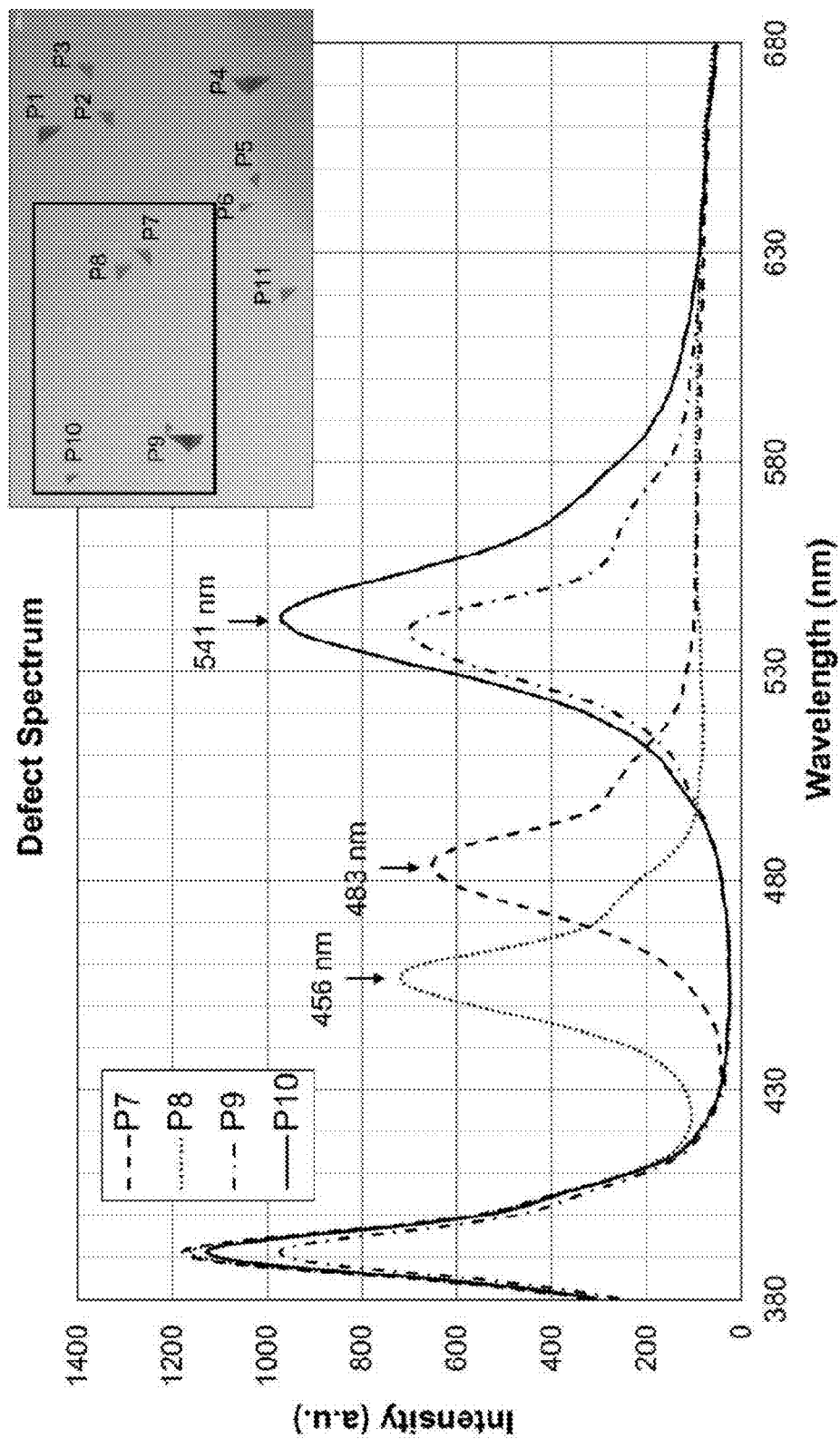

FIGS. 5A-5C are graphs showing the spectral data of the stacking fault of FIG. 4, according to an embodiment of the present disclosure. FIG. 5A is spectral data for stacking defects Nos. 1 to 3, and it can be seen that stacking defects 1 to 3 share a wavelength of 390 nm emitted from the substrate and have peak wavelengths of 541 nm, 483 nm and 483 nm, respectively. Therefore, it can be seen that stacking defect 1 is a 3C-type stacking defect, and stacking defects 2 and 3 are 3SSF stacking defects. FIG. 5B is spectral data for stacking faults 4 to 6 and 11, and it can be seen that stacking fault 4 is a 3C type, stacking fault 5 is a 3SSF, and stacking fault 11 is a 4SSF stacking fault. However, the peak wavelength of stacking fault 6 is 463 nm, which is a value not found in the stacking fault database identified so far. Such a value is classifying as unknown and can be added to the stacking fault database when characteristics are classifying according to the results of further research. Classification and additional functions through comparison of such peak wavelengths may be included in the machine learning function. FIG. 5C is spectral data for stacking faults 7 to 10, and it can be understood that stacking fault 7 is a 3SSF, stacking fault 8 is a 4SSF, and stacking faults 9 and 10 are 3C-type stacking faults.

Figure 6:
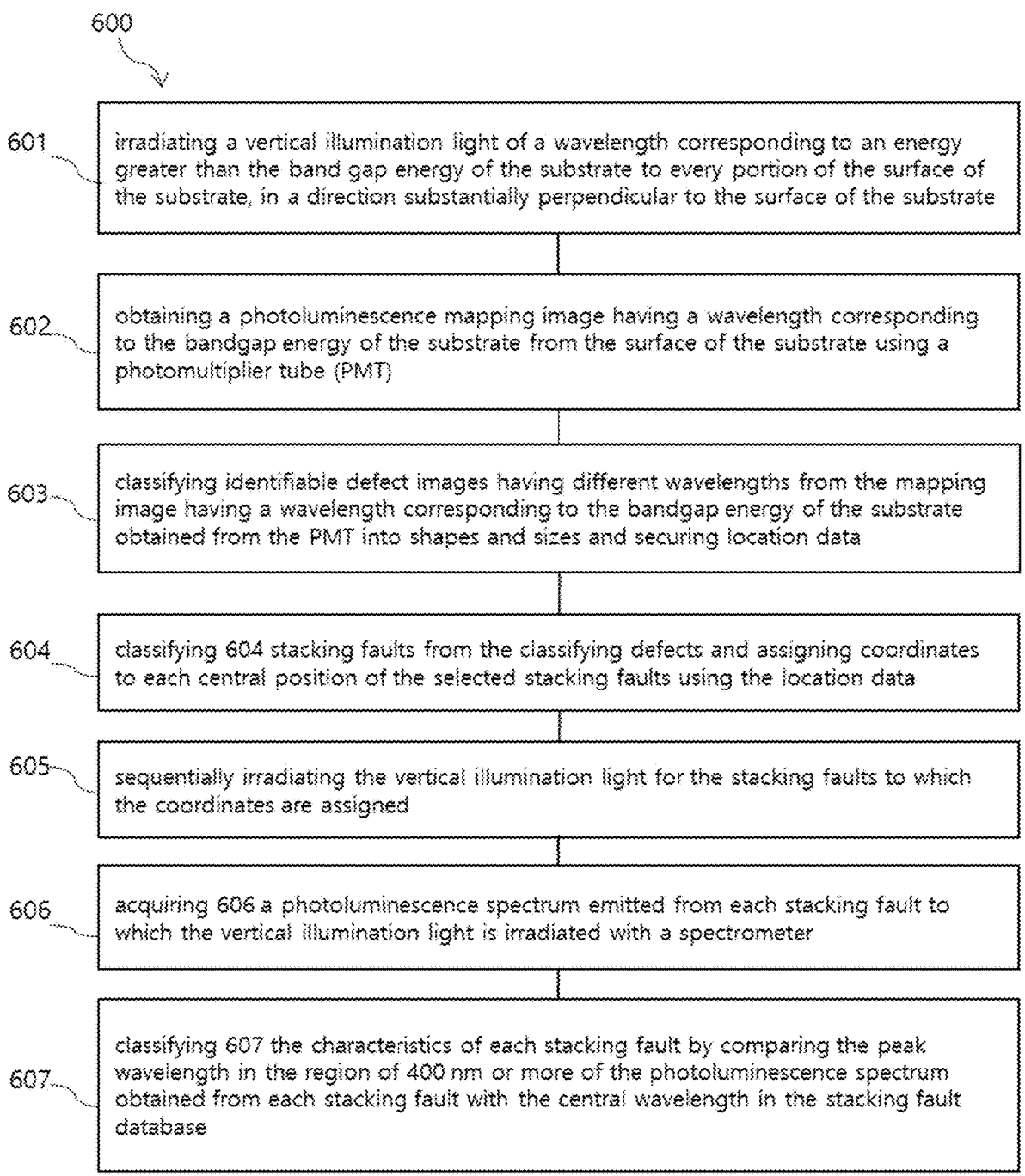
FIG. 6 is a conceptual diagram illustrating a sequence of a method for classifying stacking faults of a silicon carbide substrate using single incident light-based photoluminescence, according to an embodiment of the present disclosure.

FIG. 6 is a conceptual diagram illustrating a sequence of a method for classifying stacking faults of a silicon carbide substrate using single incident light-based photoluminescence, according to an embodiment of the present disclosure. In an embodiment of the present disclosure, a method 600 for classifying a stacking fault of a silicon carbide substrate using single incident light-based photoluminescence is comprising the steps of: irradiating 601 a vertical illumination light of a wavelength corresponding to an energy greater than the band gap energy of the substrate to every portion of the surface of the substrate, in a direction substantially perpendicular to the surface of the substrate; obtaining 602 a photoluminescence mapping image having a wavelength corresponding to the band gap energy of the substrate from the surface of the substrate using a photomultiplier tube (PMT); classifying 603 identifiable defect images having different wavelengths from the mapping image having a wavelength corresponding to the band gap energy of the substrate obtained from the PMT into shapes and sizes and securing location data; classifying 604 stacking faults from the classifying defects and assigning coordinates to each central position of the selected stacking faults using the location data; sequentially irradiating 605 the vertical illumination light for the stacking faults to which the coordinates are assigned; acquiring 606 a photoluminescence spectrum emitted from each stacking fault to which the vertical illumination light is irradiated with a spectrometer; and classifying or determining 607 the characteristics of each stacking fault by comparing the peak wavelength in the region of 400 nm or more of the photoluminescence spectrum obtained from each stacking fault with the central wavelength in the stacking fault database.

In an embodiment of the present disclosure, the classifying of the stacking fault can be executed by a computer having a program of comparing the identifiable defects classified by shape and size with the stacking fault database comprising shapes and sizes of stacking faults of 1SSF, 2SSF, 3SSF, 4SSF and 3C. The wavelength corresponding to the band gap energy of the substrate may be 390 nm, and a wavelength of vertical illumination light having a wavelength corresponding to an energy greater than the band gap energy of the substrate may be selected as 355 nm. In an embodiment of the present disclosure, the center wavelengths of 1SSF, 2SSF, 3SSF, 4SSF and 3C of the stacking fault database are 420 nm, 500 nm, 480 nm, 455 nm and 540 nm respectively, and in the range of 400 nm or more of the photoluminescence spectrum, at the step of comparing the peak wavelength of the stacking fault to the center wavelength of the stacking fault database, the peak wavelengths within 5 nm above and below the center wavelength of each stacking fault database may be classified as corresponding stacking fault.

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present application have been described in detail above, the scope of the present application is not limited thereto, and various modifications and improvements by those skilled in the art using the basic concept defined in the following claims.

All technical terms used in the present disclosure, unless otherwise defined, have the meaning as commonly understood by one of ordinary skill in the art of The present disclosure. The contents of all publications herein incorporated by reference are incorporated herein by reference.

What is claimed is:

1. A method of inspecting a stacking fault of a silicon carbide substrate, the method comprising:
    irradiating a single incident light having a first wavelength corresponding to an energy greater than a band gap energy of the substrate to scan at least a portion of the substrate;
    obtaining, using a photomultiplier tube (PMT), a mapping image of photoluminescence having a second wavelength corresponding to the band gap energy of the substrate and emitted from the at least a portion of the substrate in response to irradiating the single incident light;
    identifying a defect region having a stacking fault from the mapping image, the defect region having an intensity of the photoluminescence having the second wavelength lower than that of the second wavelength corresponding to the band gap energy of the substrate;
    obtaining location data of the defect region;
    irradiating the single incident light to the defect region;
    acquiring, using a spectrometer, a photoluminescence spectrum of photoluminescence emitted from the defect region in response to irradiating the single incident light;
    providing a stacking fault database comprising a plurality of stacking fault types and a plurality of peak wavelength ranges, each of which corresponds to one of the plurality of stacking fault types, wherein the plurality of stacking fault types comprise a first stacking fault type, and the plurality of peak wavelength ranges comprise a first peak wavelength range that corresponds to the first stacking fault type;

determining that a peak wavelength in the photoluminescence spectrum of the defect region is within the first peak wavelength range; and determining, based on the determination that the peak wavelength is within the first peak wavelength range, the stacking fault in the defect region as the first stacking fault type.

2. The method of claim 1,
wherein the plurality of stacking fault types comprise 1SSF, 2SSF, 3SSF, 4SSF and 3C.

3. The method of claim 1,
wherein the second wavelength is 390 nm, and the first wavelength is 355 nm.

4. The method of claim 2,
wherein the peak wavelength ranges of 1SSF, 2SSF, 3SSF, 4SSF and 3C are 420±5 nm, 500±5 nm, 480±5 nm, 455±5 nm and 540±5 nm, respectively.

5. An apparatus for inspecting a stacking fault of a silicon carbide substrate using single incident light-based photoluminescence, the apparatus comprising:

a sample stage configured to fix the silicon carbide substrate and move the substrate to allow the substrate to be scanned by a single incident light;

an incident light source configured to irradiate the single incident light having a first wavelength corresponding to an energy greater than a band gap energy of the substrate;

a photomultiplier tube (PMT) configured to obtain a photoluminescence mapping image of photoluminescence having a second wavelength corresponding to the band gap energy of the substrate;

a spectrometer configured to obtain a photoluminescence spectrum of photoluminescence emitted from a defect region having a stacking fault;

a stacking fault database comprising a plurality of stacking fault types and a plurality of peak wavelength ranges, each of which corresponds to one of the plurality of stacking fault types, wherein the plurality of stacking fault types comprise a first stacking fault type, and the plurality of peak wavelength ranges comprise a first peak wavelength range that corresponds to the first stacking fault type; and at least one controller configured to:
cause the incident light source to irradiate the single incident light having the first wavelength to the substrate, cause the sample stage to move with respect to the single incident light to allow the single incident light to scan at least a portion of the substrate, cause the PMT to obtain a mapping image of the photoluminescence having the second wavelength corresponding to the band gap energy of the substrate and emitted from the at least a portion of the substrate in response to irradiating the single incident light, identify a defect region having a stacking fault from the photoluminescence mapping image of the substrate obtained from the PMT, the defect region having an intensity of the photoluminescence having the second wavelength lower than that of the photoluminescence having the second wavelength corresponding to the band gap energy of the substrate, obtain location data of the defect region, cause the sample stage to move the substrate and the incident light source to irradiate the single incident light to the defect region, cause the spectrometer to photoluminescence spectrum of photoluminescence emitted from the defect region of the stacking fault in response to irradiating the single incident light, determine if a peak wavelength in the photoluminescence spectrum of the defect region is within the first peak wavelength range, and in response to the determination that the peak wavelength is within the first peak wavelength range, determine the stacking fault in the defect region as the first stacking fault type that corresponds to the first peak wavelength range.

6. The apparatus of claim 5,
wherein the plurality of stacking fault types comprise 1SSF, 2SSF, 3SSF, 4SSF and 3C.

7. The apparatus of claim 5,
wherein the second wavelength is 390 nm, and the first wavelength is 355 nm.

8. The apparatus of claim 6,
wherein the peak wavelength ranges of 1SSF, 2SSF, 3SSF, 4SSF and 3C are 420±5 nm, 500±5 nm, 480±5 nm, 455±5 nm and 540±5 nm respectively.

9. A non-transitory computer-readable storage medium storing at least one instruction therein, wherein the at least one instruction, when executed by a processor of an inspection apparatus, causes the processor to perform the method of claim 1.

* * * * *

UNITED STATES PATENT AND TRADEMARK OFFICE
CERTIFICATE OF CORRECTION

PATENT NO. : 12,372,469 B2
APPLICATION NO. : 17/660770
DATED : July 29, 2025
INVENTOR(S) : Huyndon Jung Page 1 of 1

It is certified that error appears in the above-identified patent and that said Letters Patent is hereby corrected as shown below:

In the Claims

In Column 10, Claim 5, Line 20, delete "the spectrometer to photoluminescence spectrum" and insert --the spectrometer to obtain a photoluminescence spectrum--.

Signed and Sealed this
Twenty-first Day of October, 2025

John A. Squires
*Director of the United States Patent and Trademark Office*